United States Patent
Altman et al.

(10) Patent No.: US 6,848,210 B1
(45) Date of Patent: Feb. 1, 2005

(54) BIODEGRADABLE CHUM CONTAINER

(76) Inventors: Sanford D. Altman, 16400 NW. 2nd Ave., Suite 101, North Miami Beach, FL (US) 33169; Mathew J. Cicero, 4595 NW. 37th Ct., Miami, FL (US) 33142

( * ) Notice: Subject to any disclaimer, the term of this patent is extended or adjusted under 35 U.S.C. 154(b) by 0 days.

(21) Appl. No.: 10/355,521

(22) Filed: Jan. 31, 2003

(51) Int. Cl.7 .............................. A01K 97/02
(52) U.S. Cl. .................................... 43/44.99
(58) Field of Search ............................. 43/44.99; 426/1

(56) References Cited

U.S. PATENT DOCUMENTS

| | | | |
|---|---|---|---|
| 2,656,769 A | * 10/1953 | Hultkrans | ................... 493/199 |
| 3,047,975 A | 8/1962 | Pretorius | |
| 3,421,899 A | 1/1969 | Humphreys et al. | |
| 3,852,913 A | * 12/1974 | Clendinning et al. | ........... 47/74 |
| 3,854,235 A | 12/1974 | Thompson | |
| 3,953,934 A | 5/1976 | Visser | |
| 4,099,976 A | * 7/1978 | Kraskin et al. | ........... 106/18.35 |
| 4,195,436 A | * 4/1980 | Moure | ........................ 43/100 |
| 4,809,455 A | 3/1989 | Smart | |
| 4,903,430 A | 2/1990 | DeWan | |
| 4,920,684 A | 5/1990 | Vincent | |
| 5,054,230 A | 10/1991 | Woodman | |
| 5,085,000 A | * 2/1992 | Ford | ............................ 43/55 |
| 5,156,111 A | * 10/1992 | Heggelund | ................... 119/218 |
| 5,243,779 A | * 9/1993 | Reed | ........................ 43/43.12 |
| 5,354,616 A | * 10/1994 | Fish et al. | ................... 428/373 |
| 5,434,004 A | 7/1995 | Ajioka et al. | |
| 5,487,947 A | 1/1996 | Kakishita et al. | |
| 6,009,657 A | 1/2000 | Morton et al. | |
| 6,037,039 A | * 3/2000 | Koike et al. | ............. 428/195.1 |

FOREIGN PATENT DOCUMENTS

| | | |
|---|---|---|
| GB | 2 255 485 | 7/1926 |
| GB | 2 250 167 | 3/1992 |

* cited by examiner

*Primary Examiner*—Teri P. Luu
*Assistant Examiner*—Bret Hayes
(74) *Attorney, Agent, or Firm*—Saliwanchik, Lloyd & Saliwanchik

(57) ABSTRACT

A disposable, biodegradable container for holding and distributing chum. The subject container is biodegradable to avoid environmental and aesthetic pollution. Further, the subject container makes fishing a more efficient and enjoyable experience. The subject invention also provides a biodegradable device for attracting fish that is simple and easy to use as well as being economical in both cost and manufacture. The subject container is to be used in all forms of fishing, including recreational and commercial fishing.

21 Claims, 1 Drawing Sheet

US 6,848,210 B1

BIODEGRADABLE CHUM CONTAINER

BACKGROUND OF INVENTION

Fish baits or attractants to date have come in a variety of sizes, shapes, and forms. For example, fishermen may attract fish to a specific area within a given body of water by placing attractants, in particular fish food, into the water in close proximity to the fishing vessel. Alternatively, fishermen may use fish bait, often live fish, squid, or animals that contain blood, to attract fish to their fishing lines. Fish attractants, commonly known as "chum," are often placed in a bag (or "chum bag") and dropped into the water in close proximity to the fishing vessel. As is well known in the art, a chum bag (or basket) comprises a container for fish food which is of such construction that the food is automatically dispensed therefrom as the container moves in the water, upon contact by a fish, due to water currents, or when induced by the fisherman.

Containers often used as chum bags or baskets are of relatively heavy and expensive construction, reusable, and non-degradable. These containers are typically messy to clean or dispense, especially at the end of the day when fishing activities have been completed and the container is brought back into the boat. Some fisherman simply cut the container loose, polluting the water and endangering other fish that may get caught in the discarded bag.

A variety of devices are available to dispense fish attractants or chum. For example, a cylindrical container having a plurality of holes is available to hold and gradually release granularized chum in water to attract fish. Another chum dispenser includes a perforated cylindrical body providing a repository and release mechanism for granular fish bait. Attached to the body are two hooks designed to receive live bait. None of these containers are biodegradable.

Awareness and concern about the environmental impact of fishing has mounted in recent years. The public has become increasingly concerned about abandoned fishing tackle/bait in the sea, rivers, lakes, and marshes. Such items have harmfully affected the environment by contaminating natural settings and injuring birds and aquatic organisms. For example, fishing tackle/bait adversely affect the ecological system by coiling around birds and aquatic organisms, sometimes resulting in the death of the bird or organism. Moreover, fishing tackle/bait abandoned or left to stand in water may be dangerous to other fishermen. Discarded fishing tackle/bait can impair ship navigation by wrapping themselves around the rudder or a propeller of a ship. These issues have become a serious social problem with the increase in the fishing population.

Accordingly, dissolvable containers for fish bait have been disclosed. For example, several forms of disposable casting containers attached to the fishing lines are disclosed. These casting containers provide a casting weight and a means for protecting hook bait when the fishing line is cast. These fish bait containers are biodegradable and/or open upon contact in water. Unfortunately, these containers are not used independently of the fishing line and/or are used for fish bait rather than as a substance to attract fish to a specific area. Thus, a fisherman may have to use several of these containers during a single fishing outing.

BRIEF SUMMARY

The subject invention provides a disposable, biodegradable container that distributes chum. In a preferred embodiment, the disposable, biodegradable container is attached to a line separate from the main fishing retrieval line so as to continuously provide a fish attractant during a fishing outing. In a particular embodiment, the subject invention is a disposable bag that degrades in water at a rate slower than the dispensation of chum. Thus, the chum has essentially completely left the chum container prior to loss of structural integrity of the container due to decomposition.

The subject invention further provides a means for triggering fish to feed and for concentrating fish in a small area. By utilizing the subject invention, fishermen can get fish to come to them and bite the bait offered. In accordance with the subject invention, fishermen can use the biodegradable chum container to increase their catch rate as well as to activate a swarming process.

According to the subject invention, the bag includes at least one perforation therein through which the fish attractant is released when the bag is placed into water. The subject container is biodegradable to avoid environmental and esthetic pollution. Further, the subject container makes fishing a more efficient and enjoyable experience.

In one embodiment, the subject container is composed of a biodegradable material that incorporates chum. For example, the biodegradable material may include some form of fish attractant (i.e., fish oils) that disseminates as the container decomposes.

The use of the subject biodegradable chum bag is simple, clean, and provides an efficient, environmentally-safe method for luring fish to a desired area. Chum is placed into the interior of the biodegradable chum container. The opening to the chum container is then closed to prevent the unwanted dispersal of chum. The now-filled biodegradable chum container is then attached to a non-fishing line and cast into the water. The chum goes out through at least one perforation to attract fish. When fishing is concluded, the biodegradable container, in accordance with the subject invention, can be released from the non-fishing line and left to naturally degrade in water. In one embodiment, the non-fishing line is composed of biodegradable materials and can be released into the water with the biodegradable chum container.

The subject invention can be used for all forms of fishing. In a preferred embodiment, the subject invention provides a chum bag for use in recreational fishing that is designed to degrade at some time beyond the utility of the chum to attract fish.

A primary object of the present invention is to provide an environmentally friendly disposable device for attracting fish.

Another object is to provide a biodegradable device for attracting fish that is simple and easy to use.

Yet another object is to provide a biodegradable device that is economical in both cost and manufacture.

DETAILED DISCLOSURE

Figure 1:
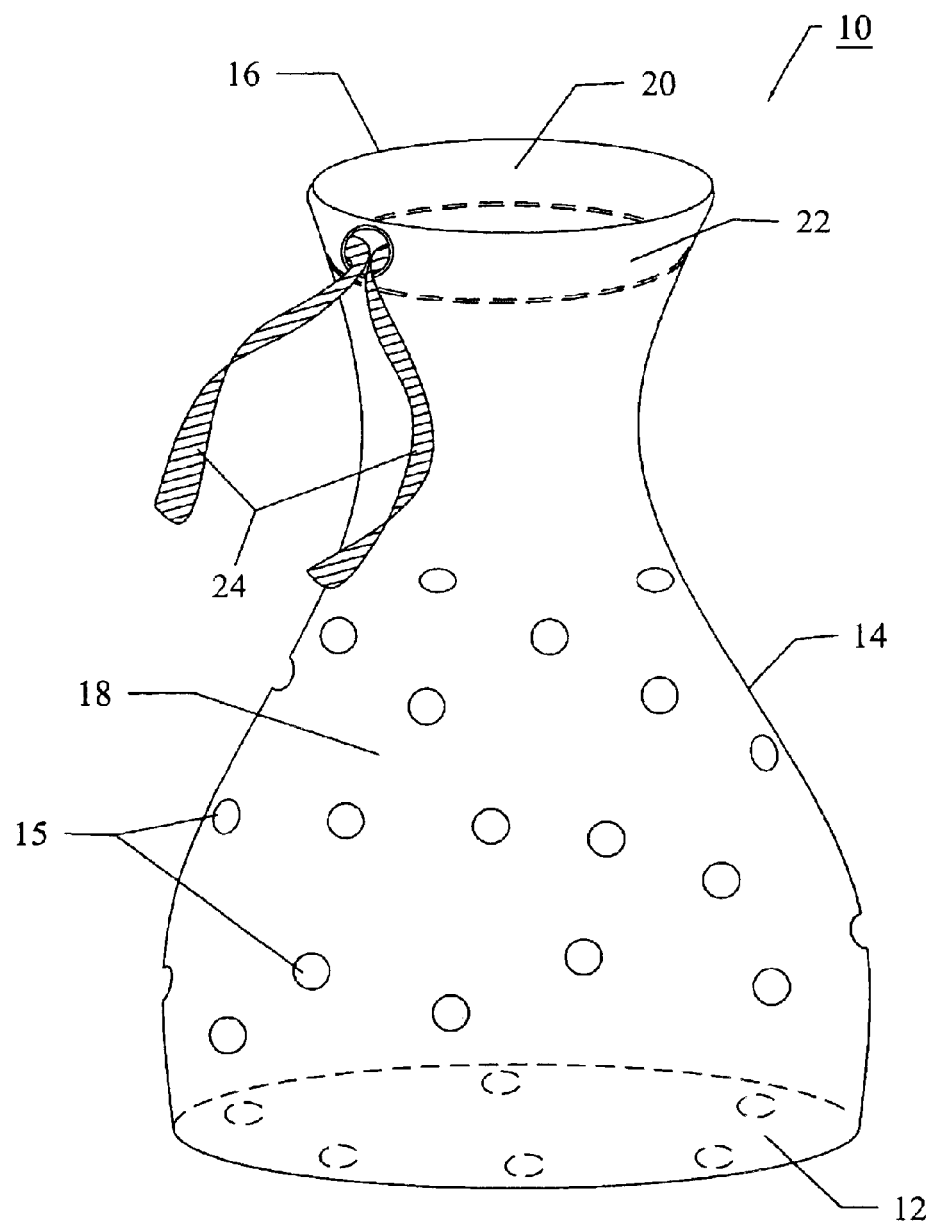
FIG. 1 shows a chum container according to the present invention.

The present invention provides a biodegradable container for holding chum or fish attractant for recreational fishing. It is contemplated that the present invention, in use, will lure fish to a desired area. In a preferred embodiment, the biodegradable container includes a mesh bag that decomposes after immersion in water at some time beyond the utility of the chum or fish attractant; meaning, the chum has essentially completely left the container prior to the loss of structural integrity of the container due to decomposition.

According to the subject invention, the biodegradable container includes a hollow interior and an open end that may be fastened shut with materials known to the skilled artisan. For example, the open end may be fastened using biodegradable glue, clasps, or string. Alternatively, the opening can be closed using non-biodegradable fasteners that are retained for reuse. The container can include a means for adjusting the buoyancy of the container.

The use of the subject biodegradable chum bag is simple, clean, and provides an efficient, environmentally-safe method for luring fish to a desired area. Chum is placed into the interior of a biodegradable chum container. The opening to the chum container is closed to prevent the unwanted dispersal of chum. The now-filled biodegradable chum container is then attached to a non-fishing line and cast into the water. The non-fishing line is retained by the fisherman (or attached to the fishing vessel) to prevent the container from drifting too far away from the fishing vessel. Chum goes out through at least one perforation. When fishing is concluded, the biodegradable container, in accordance with the subject invention, can be released from the non-fishing line and left to naturally degrade in water. In one embodiment, the non-fishing line is composed of biodegradable materials and can be released into the water with the biodegradable chum container.

Definitions

The term "chum," as used herein, refers to all materials commonly used to attract fish to a region near a fishing location. Chum can include, for example, many natural food items including live baitfish, whole dead baitfish, and chunked baitfish. Common baitfish include menhaden, shrimp, herring, ballyhoos, pilchards, smelt, alewives, anchovies, sardines, mullet, or other indigenous forage fish. Another form of chum includes a soup-like mixture composed of ground-up fish, crustaceans, mollusks and worms. Chum can also be composed of non-fish organic substances like bread, grains (especially corn), processed meats, spices, dog food, oil, or blood.

The term "non-fishing line," as used herein, refers to a line that does not include a means for capturing fish, such as a hook and bait.

The term "fishing," as used herein, refers to all forms of fishing including recreational fishing, commercial fishing, freshwater fishing, saltwater fishing, coldwater fishing, warm water fishing, and the like.

The term "biodegradable," as used herein, refers to the ability to readily decompose by biological means, in particular, in water. As contemplated by the subject invention, "readily decompose" includes a decomposition period of at least about two hours up to about two months.

According to the present invention, the container is composed of biodegradable material that decomposes at a rate slower than the dispensation of chum contained within the container. In a preferred embodiment, the biodegradable material is substantially decomposed after about two months of immersion in water. In another embodiment, the biodegradable material is substantially decomposed after about eight to twelve hours of immersion in water. In a further embodiment, the biodegradable material has substantially decomposed after about twenty-four hours of immersion in water.

There are a variety of well-known, biodegradable materials from which the subject container can be prepared including, but not limited to, polyvinyl alcohol resins ("PVA"); polyethylene oxide resins ("PEO"); methyl cellulose; hydroxyl propyl cellulose; polysaccharides (i.e., starches); including any naturally-occurring or synthetic processed biodegradable materials or the like.

In a related embodiment, the container is composed of biodegradable materials that incorporate chum. By way of example, the biodegradable material can include fish attractants (i.e., fish oils, fish foods) that are dispersed in water as the container decomposes.

The biodegradable container according to the present invention includes at least one opening through which chum or fish attractant material is inserted. The opening can be fastened shut using a variety of closing means well known to those skilled in the art. The closing means includes, but is not limited to, a flap material integral to the container that can be fastened over the opening to close the opening. The flap can be held in place using biodegradable fasteners such biodegradable glues, clasps, or ties. In an alternate embodiment, the container is in the form of a bag and the edge of the bag that defines the opening is turned back upon itself and secured to the walls of the bag to create an annular channel adapted to receiving a drawstring therein. A biodegradable drawstring that is elongate and flexible in structure having two free ends is disposed within the annular channel to define an adjustable loop between the free ends. The loop formed by the drawstring is adjustable in a tightened configuration around the opening to the container/bag for closing the opening. Further embodiments include closing means that are non-biodegradable and reusable.

According to the subject invention, the biodegradable chum container can also include a means for adjusting the buoyancy of the contained when in water. The buoyancy adjuster is biodegradable and includes materials well known to those skilled in the art. For example, a buoyancy adjuster includes, but is not limited to, air, foams or weights. The buoyancy adjuster may be inserted into the interior of the container with the chum or attached to the outside of the container. In a preferred embodiment, the buoyancy adjuster is environmentally-safe.

According to the subject invention, the biodegradable chum container includes at least one perforation to allow for the dispensation of chum contained therein. The perforation(s) are of sufficient number and size to allow for the slow release and distribution of the chum into the water so as to continuously attract fish to a fishing location. In a preferred embodiment, the number and size of the perforations of the biodegradable chum container are such that the chum is distributed over at least a half hour period. In another embodiment, the number and size of the perforations of the biodegradable chum container are such that the chum is distributed into the water for up to thirty days.

The biodegradable chum container according to the present invention can be of any size and shape consistent with the teachings provided herein. For example, the size and shape of the biodegradable chum container can be determined by the amount and consistency of the chum used in luring fish to the fishing location. The biodegradable chum container can be composed of stiff or malleable biodegradable materials. In a preferred embodiment, the biodegradable chum container is in the form of an open-weave, mesh bag.

Contemplated chum include those chum generally used in fishing including, but not limited to, ground up raw fish parts, and/or chopped up boiled baits, and/or vegetable natural baits (i.e., sweet corn and silkweed), and/or powders of nutritional value, pastes, and/or additives (i.e., flavors, odiferous oils, amino acids, and emulsifiers).

FIG. 1 illustrates one embodiment of a biodegradable bag 10 to hold chum in accordance with the present invention.

The bag 10 is formed of a semi-malleable biodegradable material. The bag 10 has a central axis and a generally flat bottom wall 12 and a side wall 14 integrally coupled to the periphery of the bottom wall. The flat bottom wall 12 can be of any shape. In a preferred embodiment, the flat bottom wall 12 is in the shape of a circle or square.

In alternate embodiments, the biodegradable bag 10 according to the present invention does not include a flat bottom. For example, where the bag 10 is composed of malleable material, it can be formed from an uninterrupted sheet of biodegradable material. Thus, the bottom portion of the bag will not be flat but will conform to the shape of the chum contained within the bag.

The side wall 14 is extended from the bottom wall 12 to terminate at an edge 16. The side wall 14 and bottom wall 12 of the bag thereby define a hollow interior 18. This interior 18 is sized for holding a sufficient amount of chum based on the type of fishing activity to be performed. In a preferred embodiment, the side wall 14 includes a plurality of perforations 15 to facilitate the entrance of liquid into the bag 10 and to allow chum to permeate through the perforations 15 into the water to attract fish. The edge 16 of the bag defines an opening 20. The opening 20 allows access to the interior of the bag 10 for receiving chum. The edge 16 of the bag 10 is further turned back upon itself and secured to the side wall 14 to create an annular channel 22 adapted to receiving a drawstring 24 therein.

The drawstring 24 is preferably biodegradable, elongated, and flexible in structure and has two free ends. The drawstring 24 is disposed within the channel 22 to thereby define an adjustable loop between the two free ends. The ends of the drawstring 24 are extended from the channel 22 at an adjacent location through the side wall 14. The loop formed by the drawstring 24 is adjustable in a tightened configuration around the opening 20 for closing the opening 20 and thus preventing the rapid escape of chum from the interior 18 of the bag 10.

The biodegradable chum container/bag according to the present invention serves as a disposable, environmentally friendly means for attracting fish to a fishing location. To utilize the present invention, the opening of the container/bag is exposed and chum is inserted into the container/bag. The opening is then closed by a closing means. A non-fishing line is attached to the container/bag to ensure the container/bag remains in close proximity to the fishing vessel. The container/bag is then placed into the water to attract fish to a desired area. Chum disperses out of the container through at least one perforation to attract fish. When fishing is concluded, the biodegradable container, in accordance with the subject invention, can be released from the non-fishing line and left to naturally degrade in water. In one embodiment, the non-fishing line is composed of biodegradable materials and can be released into the water with the biodegradable chum container.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A biodegradable container comprising a body comprising a substantially hollow cavity, a plurality of perforations throughout the body to dispense a chum; an opening disposed in the body to enable the chum to be inserted within the container, and a means for closing the opening, wherein the container is formed of a biodegradable material that decomposes in water at a rate such that the chum has essentially left the container prior to a loss of structural integrity of the container due to decomposition, wherein the biodegradable material is substantially decomposed after about two months in the water.

2. The chum container according to claim 1, wherein the body includes an annular channel around an edge of the opening, and wherein the means for closing the opening is a drawstring disposed within the channel to define an adjustable loop, wherein said drawstring has two ends, and with the two ends of the drawstring extended from and through the channel, the loop adjustable in a tightened configuration to prevent unwanted dispersal of the chum and the loop adjustable in a loosened configuration to provide access into the container.

3. The chum container according to claim 1, wherein the body includes a flap and a means for securing the flap over the opening.

4. The chum container according to claim 1, wherein the container further comprises a means for adjusting container buoyancy in water.

5. The chum container according to claim 4, wherein the means for adjusting the container buoyancy is chosen from the group consisting of air, biodegradable foams, or biodegradable weights.

6. The chum container according to claim 1, wherein the biodegradable material comprises naturally-occurring biodegradable materials.

7. The chum container according to claim 1, wherein the biodegradable material comprises polyethylene oxide resins.

8. The chum container according to claim 1, wherein the biodegradable material comprises methyl cellulose.

9. The chum container according to claim 1, wherein the biodegradable material comprises hydroxyl propyl cellulose.

10. The chum container according to claim 1, wherein the biodegradable material comprises polysaccharides.

11. The chum container according to claim 1, wherein the chum has essentially left the container after 7 days in water.

12. A biodegradable container comprising a body comprising a substantially hollow cavity, a plurality of perforations throughout the body to dispense chum; an opening disposed in the body to enable the chum to be inserted within the container; and a means for closing the opening, wherein the container is formed of a biodegradable material that decomposes in water at a rate such that the chum has essentially left the container prior to a loss of structural integrity of the container due to decomposition, wherein the biodegradable material is substantially decomposed after about twelve hours in the water.

13. The chum container according to claim 1, wherein the biodegradable material comprises fish attractants.

14. The chum container according to claim 1, wherein the container is a mesh bag.

15. The chum container according to claim 1, wherein the container is a box.

16. A method for luring fish to a desired location, comprising
 a) placing chum into an interior of a chum container, wherein the container comprises a substantially hollow body formed of a biodegradable material that decomposes in water at a rate such that the chum has essentially left the container prior to a loss of structural integrity of the container due to decomposition, wherein the body comprises a plurality of perforations throughout to dispense the chum; an opening disposed in the body to enable the chum to be placed within the container; and a means for closing the opening, b) closing the opening to the container to prevent unwanted dispersal of chum;

c) attaching the now-filled container to a non-fishing line having two ends, wherein a first end of the non-fishing line is attached to the now-filled container, d) casting the now-filled container into water;

e) retaining the second end of the non-fishing line to prevent the container from drifting away; and f) when fishing is concluded, releasing the container from the non-fishing line.

17. The method according to claim 16, wherein the biodegradable material is substantially decomposed after about-two months in the water.

18. The method according to claim 16, wherein the chum has essentially left the container after 7 days in water.

19. A method for luring fish to a desired location, comprising a) placing chum into an interior of a chum container, wherein the container comprises a substantially hollow body formed of a biodegradable material that decomposes in water at a rate such that the chum has essentially left the container prior to a loss of structural integrity of the container due to decomposition, wherein the body comprises a plurality of perforations throughout to dispense the chum; an opening disposed in the body to enable the chum to be placed within the container; and a means for closing the opening, b) closing the opening to the container to prevent unwanted dispersal of chum;

attaching the now-filled container to a biodegradable non-fishing line having two ends, wherein a first end of the non-fishing line is attached to the now-filled container, c) casting the now-filled container into water, d) retaining the second end of the non-fishing line to prevent the container from drifting away; and e) when fishing is concluded, releasing the biodegradable non-fishing line.

20. The method according to claim 19, wherein the biodegradable material is substantially decomposed after about two months in the water.

21. The method according to claim 19, wherein the chum has essentially left the container after 7 days in water.

* * * * *